US008816651B1

(12) United States Patent
Fell

(10) Patent No.: US 8,816,651 B1
(45) Date of Patent: Aug. 26, 2014

(54) ENGINE-GENERATOR WITH LOAD BANK AND CONTROL SYSTEM

(71) Applicant: Multiquip, Inc., Carson, CA (US)

(72) Inventor: George Fell, Carson, CA (US)

(73) Assignee: Multiquip, Inc., Carson, CA (US)

( * ) Notice: Subject to any disclaimer, the term of this patent is extended or adjusted under 35 U.S.C. 154(b) by 0 days.

(21) Appl. No.: 13/777,900

(22) Filed: Feb. 26, 2013

(51) Int. Cl.
*H02P 11/00* (2006.01)

(52) U.S. Cl.
USPC ............................... 322/21; 322/37

(58) Field of Classification Search
USPC ......................... 322/21, 22, 23, 37
See application file for complete search history.

(56) References Cited

U.S. PATENT DOCUMENTS

| 4,996,646 | A | * | 2/1991 | Farrington | 700/293 |
| 5,168,208 | A | * | 12/1992 | Schultz et al. | 322/25 |
| 5,285,147 | A | * | 2/1994 | Rashid | 322/28 |
| 5,587,647 | A | * | 12/1996 | Bansal et al. | 322/45 |
| 7,479,756 | B2 | * | 1/2009 | Kasunich et al. | 318/732 |
| 8,513,925 | B2 | * | 8/2013 | Ayana et al. | 322/44 |
| 2008/0157594 | A1 | * | 7/2008 | Peterson et al. | 307/10.1 |

* cited by examiner

*Primary Examiner* — Nicholas Ponomarenko
(74) *Attorney, Agent, or Firm* — Frank J. Dykas; Dykas & Shaver, LLP

(57) ABSTRACT

A load bank comprises one or more load resistors connected to an engine-generator and a control system for maintaining a minimum generator load when necessary for optimal operation. The control system operates the load bank to mitigate harmful effects of generator neglect and maintains loading for efficient DPF regeneration while allowing the generator to quickly dump the load bank when real load increases.

38 Claims, 4 Drawing Sheets

ENGINE-GENERATOR WITH LOAD BANK AND CONTROL SYSTEM

TECHNICAL FIELD

The disclosed embodiments relate generally to systems of engine-generators with load banks.

BACKGROUND

Electric generators, particularly portable engine-generator units, are often operated under variable load conditions. Such portable units are also often left unattended, which further causes them to be operated in sub-optimal conditions. It is well known that operating engine-generators under fluctuating load conditions can present a number of problems. As explained in U.S. Pat. No. 3,530,300 to Gunther, et al., diesel-fueled engine-generators are especially susceptible to problems associated with light-load conditions. In particular, a lightly loaded, diesel-fueled engine-generator may cause the engine portion of the machine to operate such that fuel within the engine remains unburned. This unburned fuel forms tar or carbon deposits, or both, which can collect within various parts of the engine, including exhaust pipes. This condition has historically been referred to as "wet stacking."

Diesel engines also create soot during their combustion process. When an engine is operating under lightly load conditions, it tends to create more soot. Historically, the soot was exhausted from the engine to the atmosphere via exhaust pipes. More recently, however, increasing concern about, and regulation of particulate emissions has lead to changes in the manner in which diesel engines may legally operate. Modern diesel engines, including so-called Tier IV Interim and newer engines, are equipped with particulate filters that serve to capture and remove soot from engine exhaust. The problem is that these particulate filters, which are also called diesel engine particulate filters or DPF, tend to clog with the particulate that they filter. Those clogs inhibit engine exhaust, which may significantly or entirely decrease the operability of an engine. To combat this DPF-clogging issue, modern diesel engines are often equipped with a "regeneration" feature. Regeneration involves a process in which the engine doses a DPF with diesel and then ignites that diesel to burn-off accumulated soot. The soot is reduced to ash, which falls away from the DPF, thus clearing the DPF and the engine exhaust system.

Complicating DPF regeneration in engine-generator applications is the effect of generator loading on engine performance. Engine exhaust temperature is proportional to generator loading. Thus, a lightly loaded generator causes the engine to operate with lower exhaust temperature than a generator operating under greater loading conditions. The problem is that regeneration efficiency is inversely proportional to exhaust temperature. That is, regeneration works better when an engine is operating with higher exhaust temperatures. So, in engine-generator applications, regeneration is more efficient when a generator is operating under loaded conditions.

It is known in the art that wet stacking may be mitigated by connecting to the generator a "dummy" load in parallel with the actual, or "real," load. Such dummy loads often comprise banks of resistors that may be switched in steps, often automatically, in inverse proportion to the real load. In this way, a generator may be connected so that it always experiences some minimum demand. As Gunther, et al. explains, this is represented by the equation $P_G=P_{RL}+P_{DL}$, where $P_G$ is the total generator demand, $P_{RL}$ is the demand of the real load, and $P_{DL}$ is the demand of the dummy load. This same method of operation helps reduce soot in the engine.

But despite the benefits of the system of Gunther, et al., and other similar configurations, such schemes tend to be wasteful because they cause the engine portion of the engine-generator to burn a set amount of fuel, at all times, in order to maintain $P_G$. This is because the engine must burn more fuel to maintain an increased generator output. So while the system is burning cleaner, it uses more fuel than necessary. In a world of rapidly decreasing oil supplies, and rapidly increasing fuel costs, it is desirable to balance the benefits of minimum generator loading with economic realities. Said differently, it is advantageous to decrease soot production and wet-stacking events with dummy loads (aka load banks), while at the same time being mindful of the fuel costs associated with operating dummy loads. Furthermore, load banks have not previously been employed to aid with DPF regeneration.

SUMMARY OF THE DISCLOSURE

Disclosed here is a load bank that provides a dummy load to an electric generator, which allows an engine-generator unit to more efficiently operate by decreasing the frequency of regeneration cycles an engine must initiate, and, when regeneration occurs, ensures a minimum generator load to raise exhaust temperatures and thus increase regeneration efficiency.

In accordance with some embodiments of the disclosed technology, an engine-generator and load bank system comprises a plurality of load resistors and load step contactors for engaging the load resistors. The plurality of load resistors are configured to allow for variability, or "stepping," of the total resistance of the dummy load. In other words, when the load bank is engaged, or connected, the load bank is configured to add or remove load resistors in steps, as required by system parameters. The disclosed technology is operable to entirely disconnect, or "dump," the load bank from the generator within a specified time, which may be necessary when the real load of the generator rapidly increases.

In accordance with some embodiments of the disclosed technology, the system is equipped with a generator controller and a load bank controller, which could be physically combined, that are configured to monitor both the engine side and the generator load of an engine-generator and to operate the load bank. In according with some embodiments, the system is equipped with a single controller that is configured to monitor the engine side of an engine-generator and to operate the load bank.

In accordance with some embodiments of the disclosed technology, the generator and load bank controllers are configured to initiate the load bank when certain conditions exist. The load bank is initiated when there is a "neglect scenario" or "neglect case." The generator controller, via the load bank controller, monitors the load connected to the generator to ensure that the load is within a "window" or "load window" bounded by pre-set lower and upper load levels. If the load connected to the generator remains at or below some pre-set load condition—i.e., below the window—for a pre-set duration, the generator controller signals the load bank controller to initiate the load bank. The load bank controller then increases or decreases the total resistance of the load bank by connecting or disconnecting load step resistors as necessary to maintain the load within window. If the load rises above the window, the steps of the load bank are disconnected as necessary. In this way, the total load on the generator—i.e., the real load and the resistance of the load bank—remains within pre-set limits. The pre-set load corresponds to a power demand on the generator that provides for optimal operation, which minimizes wet stacking and soot build up.

Restricting the load bank to operation in a neglect case allows one to save fuel because the load bank will only draw power from the generator when necessary to prevent wet stacking and soot build up. The generator will thus be allowed to operate in a sub-optimal state until such time as wet stacking and soot build up are likely to occur. The load window and duration variables necessary for determining a neglect scenario will thus be based on manufacturer or user-defined values directed at pinpointing the time when wet stacking and soot build up is likely to begin.

In accordance with some embodiments of the disclosed technology, the duration variable for neglect is cumulative. The generator controller will constantly monitor load levels and will track the time period for which load levels are below the window. If the cumulative time the system is operated below the window reaches the pre-set duration, the generator controller signals the load bank controller to initiate the load bank. This cumulative timing of sub-optimal operation occurs even the system is operated for short periods of time at load levels within and above the window. If, however, the system operates for a pre-set time within the window, a neglect scenario may be avoided. The system thus accounts for the cumulative nature of soot build up in the engine. The problems associated with this soot accumulation can be avoided if the engine is operated under loaded conditions for a pre-determined duration. The generator controller therefore ensures the system is operated under a designated load for a pre-set duration. This operation for a pre-set duration under set load conditions at full engine speed is disclosed here a "load cycle."

In accordance with some embodiments of the disclosed technology, the generator controller is configured to signal the load bank controller to initiate the load bank when the engine control module initiates regeneration to clean the DPF. In such a "regeneration scenario" or "regeneration case," as it is referred to here, the generator controller will signal the load bank controller to initiate the load bank, thus providing a minimum load for the system in order to maintain an engine exhaust temperature necessary for the DPF regeneration to effectively clean the DPF.

In accordance with some embodiments of the disclosed technology, the generator controller will monitor engine idle time. In a configuration disclosed here as "excessive idle control," the generator controller may be configured with a pre-set maximum allowed idle time. If the maximum idle time is reached—a condition referred to here as an "excessive idle scenario" or an "excessive idle case"—the generator controller will signal the load bank controller to initiate the load bank. The system will then be required to complete a load cycle, as described above, before resuming idle speeds. If a user attempts to disrupt the load cycle, the generator controller will initiate a warning to the user. If a user nonetheless disrupts the load cycle, the generator controller will disable the system and will not allow operation until a load cycle has been completed at full engine speed. The load under which the generator operates during the load cycle could include any combination of real load and dummy load levels, as long as $P_G$ is maintained. In accordance with some embodiments, for every three (3) hour period of engine idle time, the engine must complete a load cycle of one (1) hour.

In accordance with some embodiments of the disclosed technology, the generator controller may be configured with what is disclosed here as a "load dump" feature. In such a configuration, the generator controller signals the load bank controller to disconnect, or dump, the load bank if the generator controller and/or load bank recognizes a "load spike" of monitored load. Load spike, as used here, is a scenario in which the load connected to the engine-generator exceeds some pre-set value.

In accordance with some embodiments of the disclosed technology, the generator controller controls the load bank directly, thus obviating the need for a separate load bank controller.

In accordance with some embodiments of the disclosed technology, the system may be equipped with remote monitoring.

In accordance with some embodiments of the disclosed technology, the generator controller is configured with a manual setting. In the manual setting, the load bank may be engaged or disengaged by manual operation. In the manual setting, an operator may manually direct the controller to increase or decrease total resistance of the load bank.

In accordance with some embodiments of the disclosed technology, the load bank may be completely disabled and locked out of operation. In such a state, the total load of the generator is equal to the real load.

DETAILED DESCRIPTION

Reference will now be made in detail to embodiments, examples of which are illustrated in the accompanying drawings. In the following detailed description, numerous specific details are set forth in order to provide a thorough understanding of the disclosed concepts. It will, however, be apparent to one of ordinary skill in the art that the disclosed concepts may be practiced without these specific details. Well-known methods, procedures, components, circuits, and networks have not been described in detail so as not to unnecessarily obscure aspects of the embodiments.

Figure 1A:
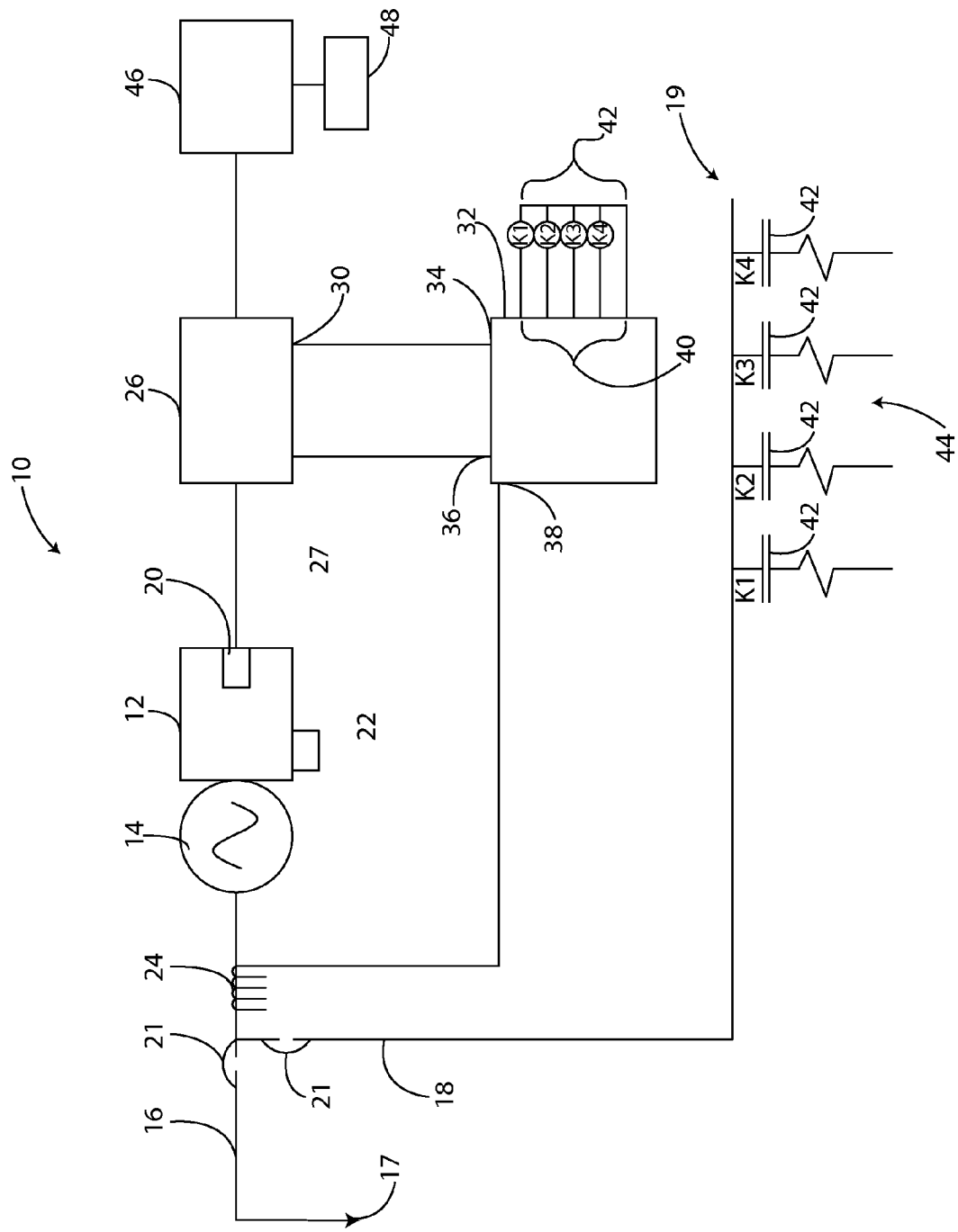
FIG. 1A is a single-line diagram of an embodiment of the disclosed system.

FIG. 1A depicts an engine-generator and load bank system 10 comprising an engine 12 mechanically connected and configured to drive an alternator 14. This combination is referred to as an engine-generator. The generator portion of the engine-generator, or alternator 14, is connected to an output bus 16, which is connected to a real load 17, and a load bank bus 18, which is connected to a load bank 19. The output bus 16 and load bank bus 18 are connected to the alternator 14 by way of disconnects 21. The disconnects 21 could comprise circuit breakers or fused switches.

The alternator 14 may be sized and configured for a variety of rated output. In some embodiments, the alternator 14 is adjustable to provide a variety of voltage outputs as selected by a user. The alternator 14 may be single-phase or polyphase; and it may be rated for a variety of operating frequencies. In one embodiment, the alternator 14 is rated 240Y/139 V, three-phase, four-wire, 60 Hz, and is adjustable for operation at 208Y/120 V. In one embodiment, the alternator 14 is rated 480Y/277 V, three-phase, four-wire, 60 Hz.

The engine 12 is equipped with an engine control module 20 and a diesel particulate filter (DPF) 22. The system 10 also has at least one load monitoring device 24 that is in electrical communication with the output bus 16 and the load bank bus 18. The load monitoring device 24 could be any piece or combination of electrical metering equipment suitable for gathering and communicating data about system voltage, current, and/or power. In a preferred embodiment, the load monitoring device 24 comprises current transformers.

The system 10 comprises a generator controller 26 which is connected to the engine control module 20 via a communication means 27. The communication means 27 could be any communication bus suitable for communication between, and for diagnostics of engine components. In a preferred embodiment, the communication means 27 comprises SAE J1939-based protocol.

The generator controller 26 has a load dump output 28 and a load enable output 30. The system 10 also includes a load bank controller 32 which has a load enable input 34, a load dump input 36, and a load sensor 38. The load sensor 38 is connected to and accepts an input from the load monitoring device 24 for monitoring the combined load of the real load 17 and the load bank 19.

The load bank controller 32 is also equipped with at least one load step output 40. The load bank controller 32 could have one or a plurality of load step outputs 40. The at least one load step output 40 is connected to at least one load step contactor 42, which control(s) the electrical connection of at least one load step resistor 44 to the load bank bus 18. The output bus 16, load bank bus 18, and load step resistor(s) 44 may be single- or poly-phase, as required for operation with the configuration of the alternator 14. In a preferred embodiment, the load bank controller 32 is equipped with four load step outputs 40. In a preferred embodiment, there are four (4) load step resistors 44, each rated 25 kW at 480 V, such that the total rated resistance of the load bank 19 is 100 kW at 480 V, with a power factor of 1.0.

In one embodiment, the engine 12, which is equipped with a radiator, and alternator 14 are mounted within one enclosure, and the load bank 19 is mounted within a separate enclosure that is physically connected to the engine-generator enclosure adjacent to the radiator of the engine 12. In such an embodiment, the radiator of the engine 12 forces air over the load step resistor(s) 44. In another embodiment, the load bank 19 is remotely located, and it is physically connected to the engine 12 and alternator 14 only to the extent necessary to facilitate electrical communication and control. In another embodiment, the load bank 19, the engine 12, and the alternator 14 are configured on a common base, which could include a common trailer or skid, within a single enclosure.

The system 10 may also be equipped with a remote communications module 46 and an antenna 48. The remote communications module 46 could comprise terrestrial wireless or satellite communications technology, or a combination of both, in tandem or redundantly. The remote communications module 46 allows the system 10 to periodically, or on demand, transmit data that may be monitored. Such data may include the status of the engine 12, the DPF 22, and the load bank 19. The remote communications module 46 could also be equipped with means for transmitting a location via a global positioning system (GPS), or the like. The remote communications module 46 may also be equipped to receive data and relay it to the generator controller 26 for remote control of the system 10. In one embodiment of the system 10 equipped with a remote communications module 46, a fault condition in any portion of the system 10 will cause an alert to be sent to an operator via phone text message (SMS) or via electronic mail.

Specific data transmitted by the remote communications module 46 may include: the fuel level of the engine 12 in a range from 0 to 100%; the fuel consumption rate of the engine 12 in gallons per hour; oil pressure of the engine 12 in pounds per square inch; temperature of the coolant in the engine 12 in degrees Fahrenheit or degrees Celsius; the on/off status of the DPF 22; the soot level of the DPF 22; whether the DPF 22 regeneration function has been inhibited or disabled; the temperature of the exhaust of the engine 12 at various points within engine 12; the operating status of the load bank 19, and whether the load bank 19 has correctly responded to a demand request from the generator controller 26.

Figure 1B:
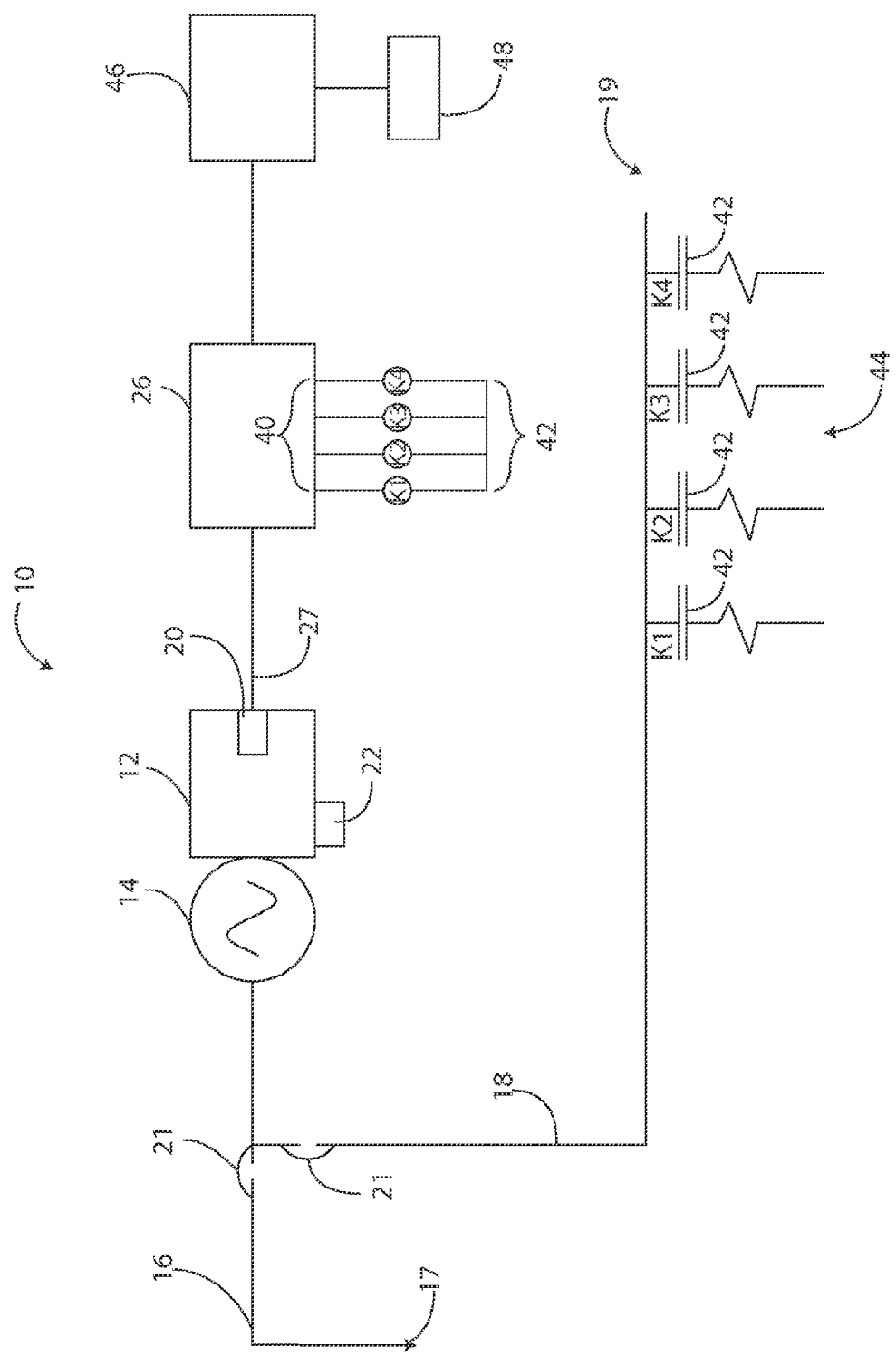
FIG. 1B is a single-line diagram of an embodiment of the disclosed system.

FIG. 1B depicts an embodiment of an engine-generator and load bank system 10 comprising an engine 12 mechanically connected and configured to drive an alternator 14. The alternator 14 is connected to an output bus 16, which is connected to a real load 17, and a load bank bus 18, which is connected to a load bank 19. The outputs bus 16 and load bank bus 18 are connected to the alternator by way of disconnects 21, which could comprise circuit breakers or fused switches. In such an embodiment, the alternator 14 may be sized and configured as described above.

In the embodiment of FIG. 1B, the engine 12 is equipped with an engine control module 20 and a DPF 22. The system 10 comprises a generator controller 26 that is connected to the engine 12 via a communication means 27, which could be any suitable communication bus as described above. The generator controller 26 is equipped with at least one load step output 40; it could have one or a plurality of load step outputs 40. The load step output(s) 40 is/are connected to one or more load step contactor(s) 42, which control the electrical connection of at least one load step resistor 44 to the load bank bus 18. The electrical system of such an embodiment may be single- or poly-phase, as described above.

In the embodiment of FIG. 1B, the generator controller 26 monitors the loading of the alternator 14 by extrapolation. The generator controller 26 receives engine operation information from the engine control module 20 via the communication means 27, which information the generator controller 26 uses to determine loading conditions of alternator 14. The generator controller 26 then directly controls the load bank 19 by way of the load step output(s) 40 and load step contactor(s) 42 as necessary in cases of neglect, regeneration, and excessive idle.

Figure 2:
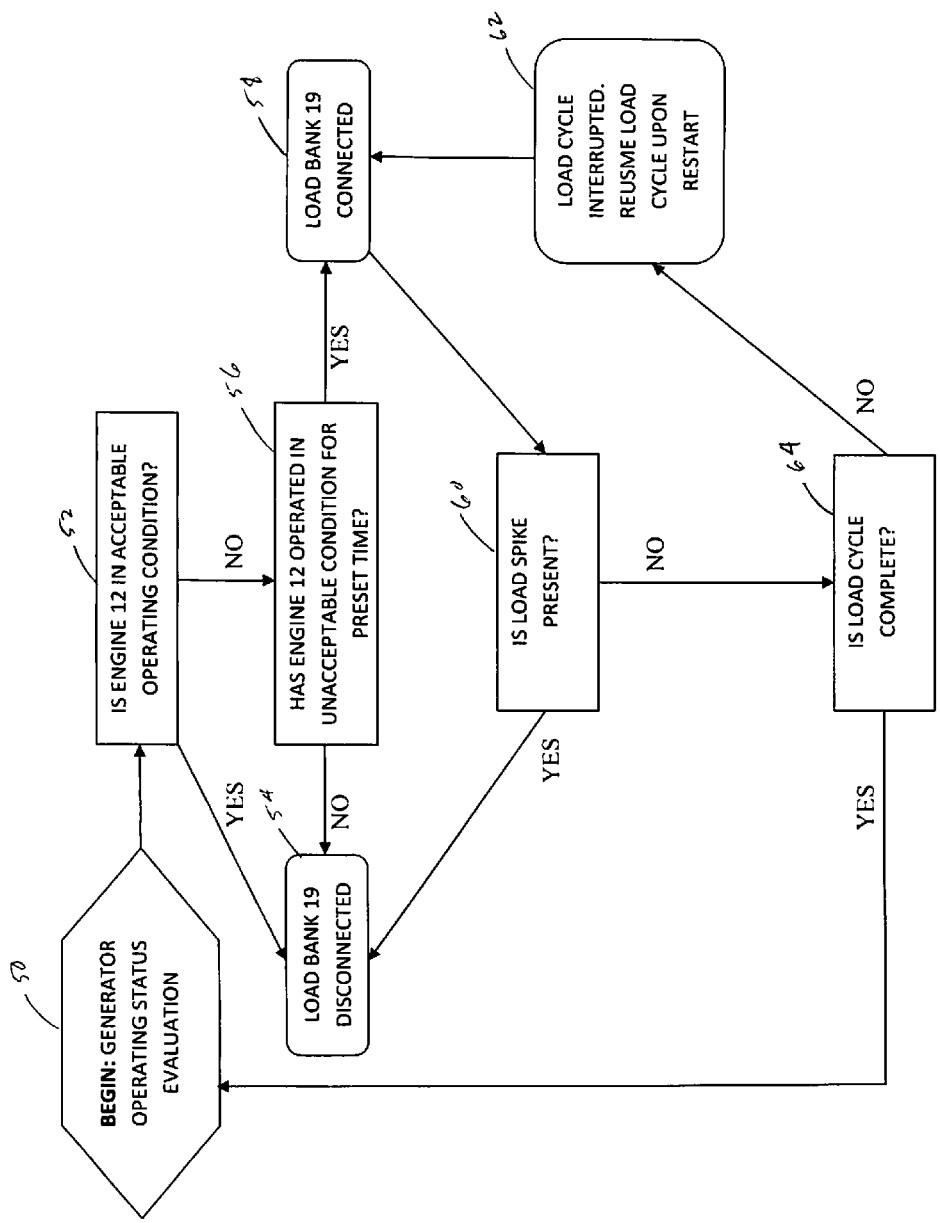
FIG. 2 is a flow chart depicting an operating configuration of an embodiment of the disclosed system.

FIG. 2 depicts a control system that the generator controller 26 may employ to control the system 10. The generator controller 26 first evaluates generator operating status 50 to determine if the engine 12 is in an acceptable operating condition 52. Whether the engine 12 is in an acceptable operating condition is a function of whether a neglect scenario or excessive idle scenario is present. Cases of neglect and excessive idle correspond to an engine 12 being in an unacceptable operating condition. Further, whether the engine 12 is in an acceptable operating condition depends on whether the exhaust temperature is sufficient to provide for effective regeneration. If the exhaust temperature is too low for effective regeneration, and if the engine 12 is in a regeneration scenario, the engine is not in an acceptable operating condition.

If the engine 12 is in an acceptable operating condition, the load bank 19 is or remains disconnected 54. If the engine 12 is not in an acceptable operating condition, the generator controller 26 determines whether the engine 12 has operated in an unacceptable state for a pre-set time 56. If the engine 12 has operated in an unacceptable condition for a pre-set time, the load bank 19 is connected 58. That is, the generator controller 26 signals the load bank controller 32 via the load enable output 30 and load enable input 34 to initiate the load bank 19 by way of the load step output 40 and the load step contactor(s) 42. Or, in an embodiment without a load bank controller 32, the generator controller 26 controls the load bank 19 directly. The load bank 19 is then operated as described supra. If the engine 12 has not operated in an unacceptable condition for a pre-set time, the load bank 19 is or remains disconnected 54.

Once the load bank 19 is connected, it remains connected for a pre-set time, as required for a load cycle. While the load bank 19 is connected, the generator controller 26 and/or the load bank controller 32 determine whether a load spike is present 60. If a load spike is present, the generator controller 26 effects a load dump by signaling the load bank controller 32, either directly or via load dump output 28 and load dump input 36, so that the load bank 19 is disconnected 54. If a load spike is not present, the generator controller 26 determines whether the load cycle is complete 64. If the load cycle is complete, the evaluation begins anew 50. If the load cycle is not complete, the load cycle will resume upon restarting 62 the system 10.

Figure 3:
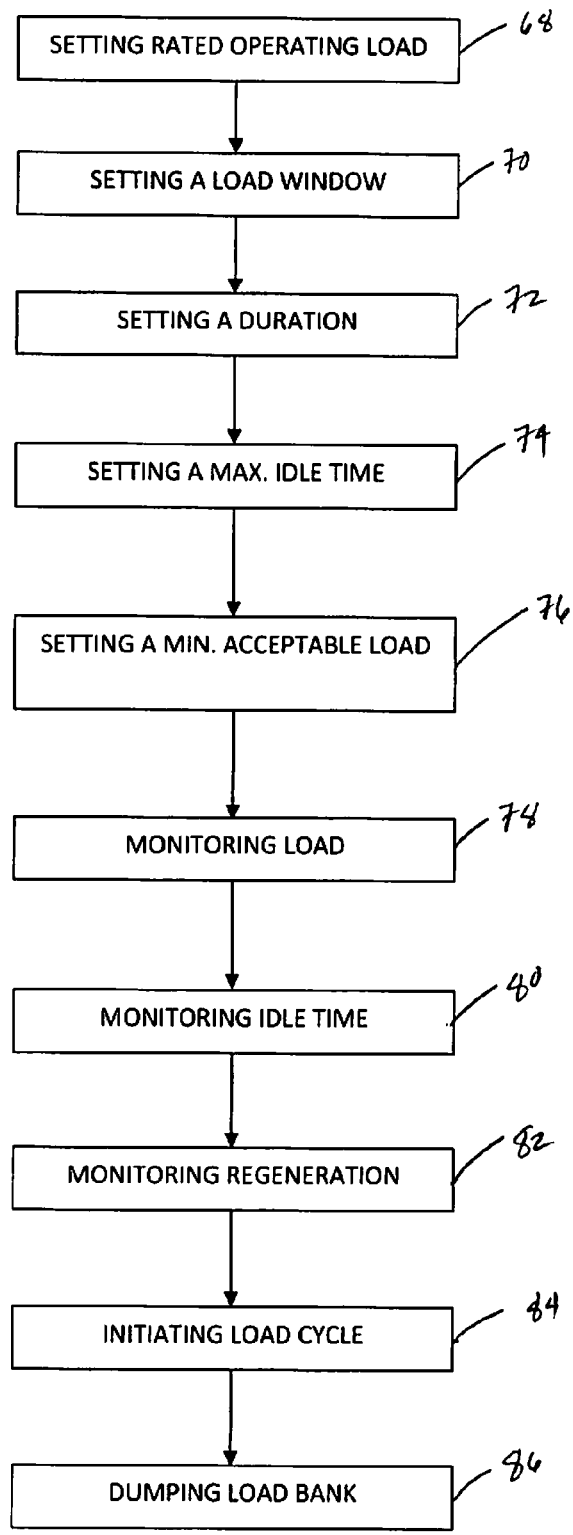
FIG. 3 is a block diagram depicting a method of operating embodiments of the disclosed system.

FIG. 3 depicts a method of operating the system 10 by configuring the generator controller 26. The method involves first setting a rated operating load 68. Then, it requires setting: a load window 70, a duration 72, a max idle time 74, and a minimum acceptable load 76 for DPF regeneration. Next, it involves monitoring: the load 78, idle time 80, and regeneration status 82. Then, it involves initiating a load cycle 84 when monitored conditions reach set points that correspond to cases of neglect, regeneration, or excessive idle. Finally, it involves dumping the load bank 86 in the presence of a load spike.

The foregoing description, for purpose of explanation, has been described with reference to specific embodiments. The illustrative discussion above, however, is not intended to be exhaustive or to limit the disclosed concepts to any particular form. The embodiments were chosen and described in order to best explain the principles of the disclosed concepts in order to enable others skilled in the art.

What is claimed is:

1. An engine-generator and load bank system comprising:
    an engine mechanically connected to and capable of driving an alternator;
        said engine having an engine control module and a particulate filter;
        said alternator in electrical communication with an output bus and a load bank bus;
    at least one load monitoring device in electrical communication with said output and load bank buses;
    a generator controller comprising a load dump output and a load enable output, said generator controller in electrical communication with said engine control module;
    a load bank controller comprising a load enable input, a load dump input, a load sensor, and at least one load step output;
        said load dump output in electrical communication with said load dump input;
        said load enable output in electrical communication with said load enable input;
        said load monitoring device in electrical communication with said load sensor;
    at least one load step contactor in electrical communication with said at least one load step output; and
    at least one load step resistor in electrical communication with said load bank bus by way of said at least one load step contactor;
    wherein said generator controller provides a control signal via said load enable output in at least one of the following cases: neglect and regeneration; and
    wherein said generator controller provides a control signal via said load dump output in case of a load spike.

2. The engine-generator and load bank system of claim 1 wherein the generator controller is further configured with excessive idle control.

3. The engine-generator and load bank system of claim 1 comprising one load step resistor.

4. The engine-generator and load bank system of claim 1 comprising a plurality of load step resistors.

5. The engine-generator and load bank system of claim 1 which further comprises a remote communication module and antenna.

6. The engine-generator and load bank system of claim 5 wherein the remote communications module communicates via satellite.

7. The engine-generator and load bank system of claim 5 wherein the remote communications module communicates via a terrestrial wireless network.

8. The engine-generator and load bank system of claim 1 wherein the engine is a diesel engine.

9. The engine-generator and load bank system of claim 1 wherein the engine is a Tier IV Interim or newer diesel engine.

10. The engine-generator and load bank system of claim 1 wherein said alternator, output bus, load bank bus, and at least one load step resistor comprise a poly-phase electrical system.

11. The engine-generator and load bank system of claim 1 wherein said alternator, output bus, load bank bus, and at least one load step resistor comprise a three-phase electrical system.

12. The engine-generator and load bank system of claim 1 which further comprises a common base and enclosure.

13. The engine-generator and load bank system of claim 1 wherein said at least one load step resistor is physically located in an enclosure connected to the radiator of said engine.

14. The engine-generator and load bank system of claim 1 wherein said at least one load step resistor is located remotely from said engine-generator.

15. The engine-generator and load bank system of claim 1 wherein the generator controller and engine control module are configured to communicate via SAE J1939 protocol.

16. The engine-generator and load bank system of claim 1 wherein the generator controller is configured to provide said control signal to said load dump output within 10 seconds.

17. The engine-generator and load bank system of claim 1 wherein the generator controller is configured to provide said control signal to said load dump output within 1 second.

18. The engine-generator and load bank system of claim 1 wherein the generator controller is configured to provide said control signal to said load dump output within 0.1 second.

19. An engine-generator and load bank system comprising:
    an engine mechanically connected to and capable of driving an alternator;
        said engine having an engine control module and a particulate filter;
        said alternator in electrical communication with an output bus and a load bank bus;
    a generator controller in electrical communication with said engine control module, said generator controller having at least one load step output;
    at least one load step contactor in electrical communication with said at least one load step output; and at least one load step resistor in electrical communication with said load bank bus by way of said at least one load step contactor;

wherein said generator controller is capable of operating said load step contactor to connect said load step resistor in at least one of the following cases: neglect and regeneration; and wherein said generator controller is capable of operating said load step contactor to disconnect said load step resistor in case of a load spike.

20. The engine-generator and load bank system of claim 19 wherein the generator controller is further configured with excessive idle control.

21. The engine-generator and load bank system of claim 19 comprising one load step resistor.

22. The engine-generator and load bank system of claim 19 comprising a plurality of load step resistors.

23. The engine-generator and load bank system of claim 19 which further comprises a remote communication module and antenna.

24. The engine-generator and load bank system of claim 23 wherein the remote communications module communicates via satellite.

25. The engine-generator and load bank system of claim 23 wherein the remote communications module communicates via a terrestrial wireless network.

26. The engine-generator and load bank system of claim 19 wherein the engine is a diesel engine.

27. The engine-generator and load bank system of claim 19 wherein the engine is a Tier IV Interim or newer diesel engine.

28. The engine-generator and load bank system of claim 19 wherein said alternator, output bus, load bank bus, and at least one load step resistor comprise a poly-phase electrical system.

29. The engine-generator and load bank system of claim 19 wherein said alternator, output bus, load bank bus, and at least one load step resistor comprise a three-phase electrical system.

30. The engine-generator and load bank system of claim 19 which further comprises a common base and enclosure.

31. The engine-generator and load bank system of claim 19 wherein said at least one load step resistor is physically located in an enclosure connected to the radiator of said engine.

32. The engine-generator and load bank system of claim 19 wherein said at least one load step resistor is located remotely from said engine-generator.

33. The engine-generator and load bank system of claim 19 wherein the generator controller and engine control module are configured to communicate via SAE J1939 protocol.

34. The engine-generator and load bank system of claim 19 wherein the generator controller is configured to operate said load step contactor to disconnect said load step resistor within 10 seconds.

35. The engine-generator and load bank system of claim 19 wherein the generator controller is configured to operate said load step contactor to disconnect said load step resistor within 1 seconds.

36. The engine-generator and load bank system of claim 19 wherein the generator controller is configured to operate said load step contactor to disconnect said load step resistor within 0.1 seconds.

37. A method for operating an engine-generator and load bank system with a generator controller and an engine control module, the generator controller configured with logic and hardware to control the load bank, the method comprising the following steps:
   a. setting a rated operating load;
   b. setting a load window bounded by a low load and an upper load in said generator controller;
   c. setting a duration in said generator controller;
   d. setting a minimum acceptable load corresponding to optimal engine exhaust temperature for regeneration;
   e. monitoring connected load of said engine-generator;
   f. monitoring regeneration of said engine-generator with said engine control module;
   g. activating said load bank if said generator operates in a neglect scenario as defined by said window and said duration;
   h. activating said load bank if said connected load is less than said minimum acceptable load and said engine-generator initiates regeneration; and
   i. dumping said load bank if a load spike is detected.

38. The method of claim 37 that further comprises the steps of:
   a. setting an maximum idle time;
   b. monitoring idle time of said engine control module; and
   c. initiating a load cycle if said idle time corresponds to maximum idle time.

* * * * *